Feb. 14, 1961 P. KLAMP 2,971,474
POWER AND FREE CONVEYOR SYSTEM
Original Filed July 30, 1956 3 Sheets-Sheet 1

INVENTOR.
PAUL KLAMP
BY Whittemore, Hulbert
Belknap
ATTORNEYS

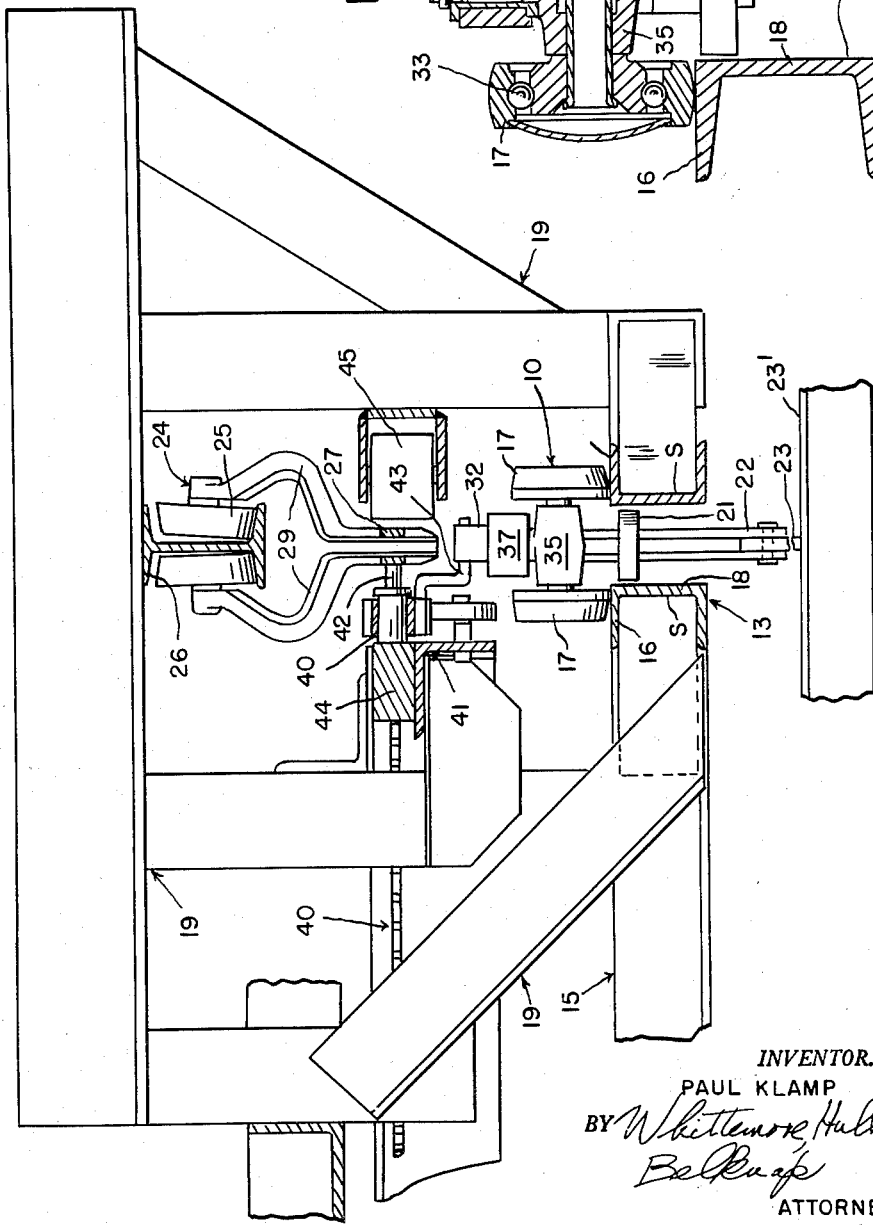
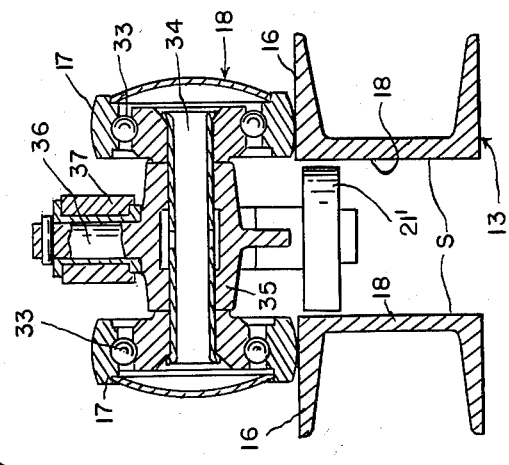

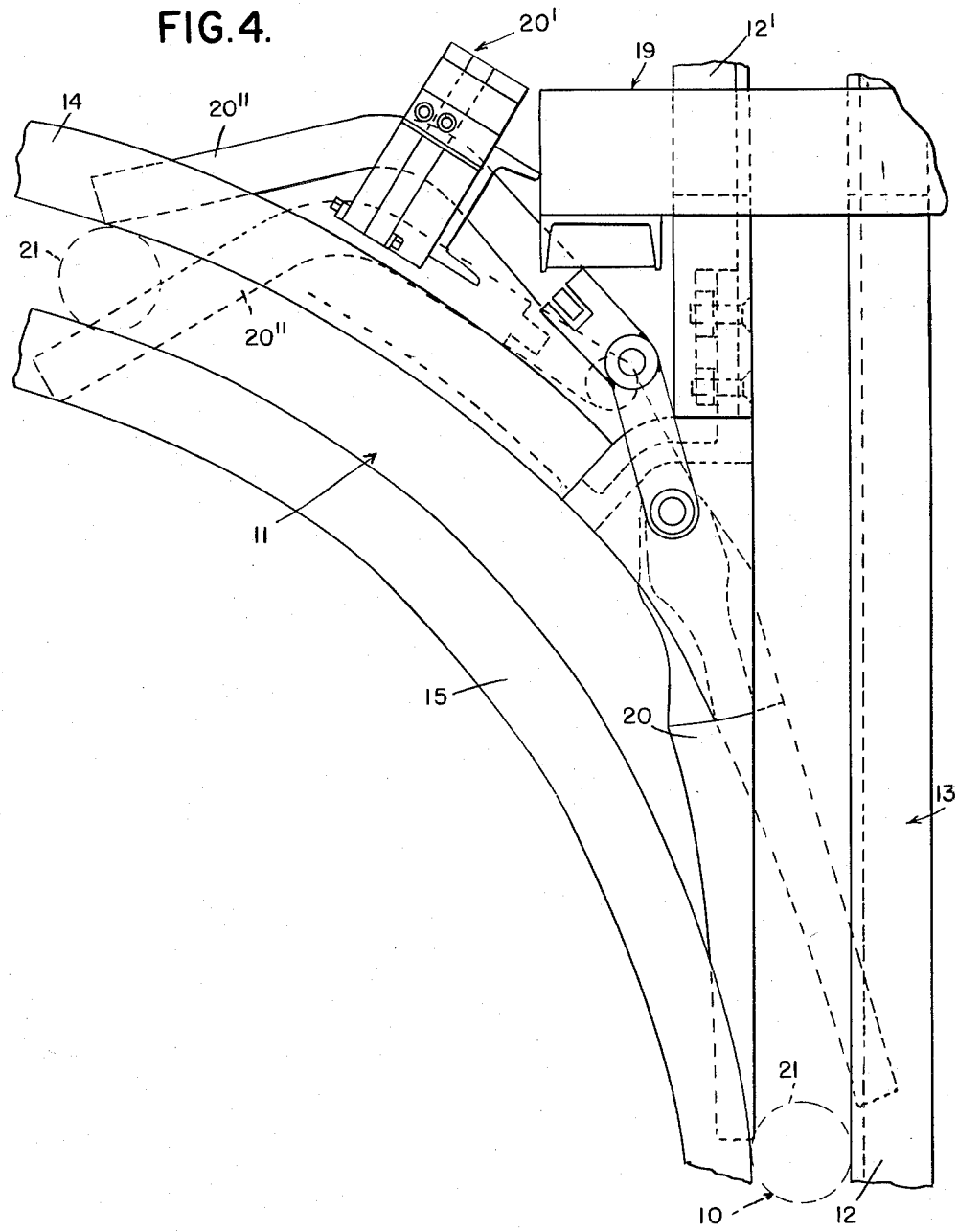

United States Patent Office 2,971,474
Patented Feb. 14, 1961

2,971,474

POWER AND FREE CONVEYOR SYSTEM

Paul Klamp, Detroit, Mich., assignor to Mechanical Handling Systems, Inc., Detroit, Mich., a corporation of Michigan Original application July 30, 1956, Ser. No. 601,001. Divided and this application Dec. 3, 1956, Ser. No. 625,646

2 Claims. (Cl. 104—172)

The present invention relates to improvements in a load supporting track trolley for an overhead conveyor system, in particular a system of the power and free type such as is illustrated and described in the copending application of Leonard J. Bishop and Paul Klamp, Serial No. 513,452, filed June 6, 1955, now U.S. Letters Patent No. 2,868,138 of January 13, 1959.

This type of conveyor is characterized by a main driving chain and trolleys traversing an endless overhead track, with a plurality of the work supporting trolleys according to the invention traversing an endless track beneath said overhead track, and advanced by driving lugs on the chain. The trolleys may be selectively diverted from a main supporting track reach beneath the driving chain onto and off a branch or "free track" at an angle to the main track, as disclosed in my copending application, Serial No. 601,001, filed July 30, 1956, now U.S. Letters Patent No. 2,868,139 of January 13, 1959, of which the present application is a division.

It is one object of the invention to provide a track trolley for a system as described, in which the trolley operates through certain track engaging, guiding and steering rollers thereof to control the operation of the switch means by which the trolley is diverted to or from the branch track. As herein shown, the operation is one of restoring the switch to a non-diverting position. In another installation it may be the restoring of a previously actuated trolley control mechanism.

Another object of the invention is to provide an improved track trolley having front and rear drive dogs, adapted to be engaged by advancing chain lugs, pivoted on a rugged trolley carriage which is borne by front and rear pairs of load supporting rollers or wheels traveling on a pair of horizontal, opposed track members, and in which front and rear guide and steering rollers engage between said track members and are swiveled in an improved manner relative to the carriage and its load supporting rollers.

A further object is to provide a trolley structure of this character featuring a load supporting hanger pivoted on the trolley carriage in an elevated relation to the load supporting and guide rollers of the latter, thus to stabilize the trolley against a tendency to up-end. The need for trolley hold-down provisions, such as are commonly required when the trolley is being pushed up a slope, is avoided.

In accordance with this object, the load supporting hanger is pivotally suspended on the trolley at a sufficiently elevated point, in reference particularly to the load supporting rollers of the trolley, to cause the load to stabilize the trolley under the combined effect of a force-couple exerted thereon by a propelling chain and acting about the forward load roller axis, as in advancing the trolley up a slope, and the load action of the forward and rearward trolley load rollers on the track. This combination of propelling and load forces occasions the up-ending effect referred to if the load is hung from a point too far down on the trolley.

More specifically, the axis of suspension is so located that the line of gravitational load action on the trolley itself is brought between the resultants of combined components of downward roller-on-track load action at the rollers and of the above-mentioned force-couple action on the trolley, as at an upwardly extending dog of the trolley.

Yet another object is to provide an improved trolley having pairs of front and rear guiding and steering rollers which travel between and are guided by the vertical webs of opposed track channel sections, on the top flanges of which the load supporting rollers travel, and in which the sets of guide rollers are journaled in depending relation to the load rollers on the horizontal axle structure of the respective front and rear load roller pairs.

A still further object is to provide a trolley construction as set forth in the preceding paragraph in which the load roller axles are carried on upright swivels journaled respectively adjacent the front and rear of the trolley carriage, thereby providing a highly desirable running action for the trolley, insuring better steerability as the trolley travels its track, under the control of vertically journaled front and rear guide rollers running between opposed upright webs of the track.

Another and more specific object is to provide a trolley featuring vertically journaled guide rollers, arranged in pairs at the front and rear of the trolley carriage; the extreme front and rear rollers of the four being at a lower elevation than the two intermediate guide rollers, so as to be capable of actuating a mechanical switch reset arm, or the like, extending through the vertical web of a trolley track section or channel. Moreover, in the interest of increased strength, rigidity and stability, the two intermediate guide rollers are located at the elevation of the top horizontal flanges of the track section, while the load supporting rollers ride those flanges in zones directly over the vertical channel webs.

A general object is to provide a trolley affording the above recited attributes of stability, steerability and the like which is at the same time very simple and economical in its construction, and extremely strong and rugged.

The foregoing as well as other objects will be made more apparent as this description proceeds, especially when considered in connection with the accompanying drawings, wherein:

Fig. 2 is a fragmentary view, partially in transverse vertical section, showing a trolley and a coacting transfer chain in relation to the main trolley drive chain and trolley structure of the conveyor system;

Fig. 3 is a view in vertical section along line 3—3 of Fig. 1; and

Fig. 4 is a fragmentary top plan view showing the main operating components of a branch track switch mechanism controlled by the trolley, different positions thereof being generally indicated in solid and dotted line.

Figure 1:
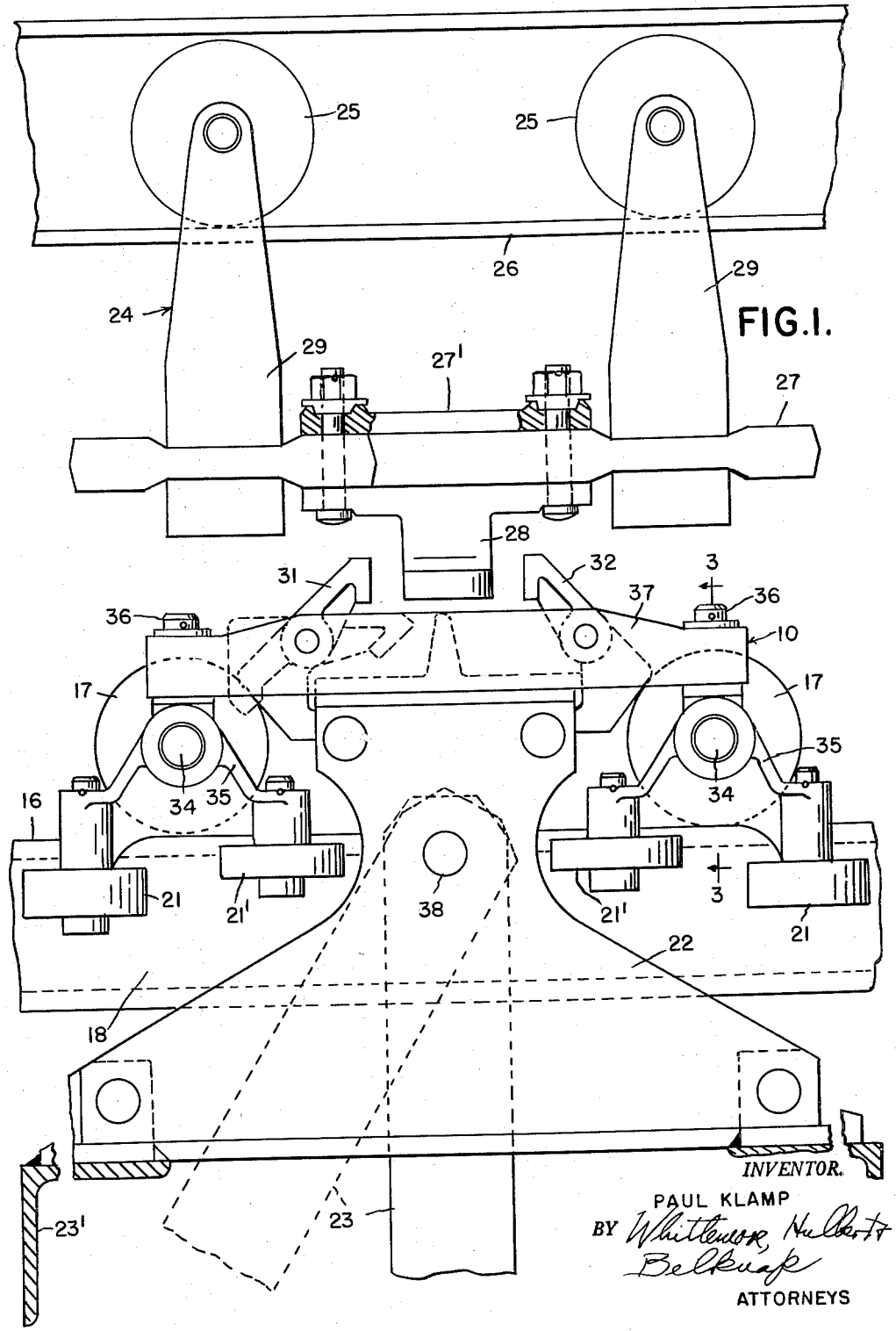
Fig. 1 is a fragmentary view in side elevation, partially broken away and in vertical section, showing a trolley assembly and its provisions for supporting and advancing the same.

Figs. 2 and 4 of the drawings depict a typical setting, illustrated and described in full detail in my copending application identified above, for the use of the improved trolley of the invention, generally designated 10. The copending application of Leonard J. Bishop and Joel H. Barlow, Serial No. 619,249, filed October 30, 1956, now U.S. Letters Patent No. 2,875,703 of March 3, 1959, concerns a related installation in which features of the trolley are also put to novel use. However, it will be appreciated that the trolley structure is in nowise limited to these particular systems.

An exit switch mechanism 11 controls the travel of the work supporting trolleys 10 in reference to approach and departure sections 12, 12' respectively, of a trolley supporting track, generally designated 13, and in reference to a branch track section 14 disposed at a 90° angle to the track 13. As indicated in Fig. 2, the track sections are constituted by opposed channel sections S disposed with their web portions face to face. The branch track 14 merges with main track 13, adjacent the switch mechanism 10, through a curved portion which is designated 15. The upper horizontal flanges 16 of these sections provide track surfaces for the pairs of front and rear load supporting rollers or wheels 17 of trolleys 10, it being noted that these rollers travel on the flanges 16 directly over the vertical webs 18 of the channels.

The structure as described is supported in an overhead position in a well known manner, as by angle iron work, generally designated 19.

Referring to Fig. 4, the reference numeral 20 designates a switch tongue of the exit switch mechanism 11, which tongue is pivoted at the junction of the curved and straight track sections 15 and 12. It is controlled, in switching trolleys onto the branch track 14, by latch structure 20' which is germane to this invention only in the feature that the tongue 20 carries a rear reset extension arm 20". In one position this arm extends through an opening in the adjacent web 18 of the curved track section 15, as shown in dotted line, for a purpose to be described.

Each trolley 10 includes forward and rearward sets of two guide rollers 21, 21', which travel between the track section webs 18, as well as a central depending hanger or frame 22 from which a load support 23 swings. The hanger 22 is provided with a conventional bumper 23' of rectangular outline.

Structural details of the load supporting rollers 17 and guide rollers 21, 21' of the trolley, and their mount on the trolley carriage, will be hereinafter set forth. In general, they serve a function of guiding the horizontal tracking of the trolley, enabling its front and rear load rollers 17 to be quite widely spaced from one another in the interest of bringing the pivot point of a load supporting hanger (to be described) as high as possible on the trolley and between the load roller axes, and thus stabilizing the trolley against up-ending, as mentioned above.

The reference numeral 24 generally designates an upper, chain driven work advancing trolley, whose rollers 25 travel along the horizontal flanges of an elongated track I-beam 26 constituting a part of the main drive chain track structure. A number of such forwarding trolleys are advanced by an endless chain 27, whose links they engage at longitudinally spaced points. As shown in Figs. 1 and 2, certain of these links specially designated 27', are provided for this purpose with depending driving lugs 28. The trolleys 24 are connected to the chain 27 by depending arms 29 appropriately secured to the chain.

As shown in Fig. 2, the chain 27 may be sustained along its side by backing rollers 45 journaled on vertical trunnions on the main track section 13 forwardly of the exit switch mechanism 11.

Referring now to Fig. 1, the load supporting trolley 10 is shown in its normal operating relation to the trolley advancing chain 27, the chain lug 28 extending downwardly between front and rear pivoted and counter-weighted trolley dogs 31, 32, respectively. The load supporting rollers 17 are mounted by ball bearings 33 (Fig. 3) on tubular cross shaft or axle elements 34, which are fixedly carried by swivel brackets or mounts 35 of the trolley 10. Upright trunnion pins 36 on the mounts 35 permit the roller assembly to swivel on a vertical axis relative to the rigid and unitary trolley carriage or frame 37, as in rounding the branch track section 15.

It will be noted by reference to Fig. 1, that there are two sets of the vertically journaled guide rollers associated with each trolley 18. These include the extreme forward and rearward rollers 21, which are located at a lower elevation than the intermediate guide rollers 21' and are thus positioned for engagement with the switch tongue extension 20" (Fig. 4) to reset tongue 20 from the dotted to the solid line position once the tongue has been unlatched by the unit 20'. It is to be noted that the intermediate guide rollers 21' are at the elevation of the horizontal top track flanges 16 to avoid engagement with the tongue extension.

The respective sets of guide rollers 21, 21' are carried by lateral extensions of the swivel brackets 35 of the trolley; the sets of rollers projecting forwardly and rearwardly of the load supporting rollers 17 of the trolley, i.e., leading and trailing its carriage 37. The trolley is thus reversible as to its position on the track.

As shown in Fig. 1, the load supporting hanger bar 23 is pivoted at 38 on the trolley hanger 22, substantially in the horizontal plane of the set of upper guide rollers 21', and closely adjacent a plane through the axes of the load rollers 17. Hence in swinging in a vertical plane, as indicated in solid and dotted line, and when on a slope, the load does not exert substantial upsetting or up-ending forces on the trolley carirage, as it would through a rigidly connected bar or a bar less advantageously pivoted at a lower elevation in relation to the trolley carriage. Hence, special hold-down means to vertically restrain the trolley 10 are unnecessary.

It is seen by reference to Fig. 1 that with the chain 27 traveling to the left its lug 28 exerts a force on the front trolley dog 31 involving a couple which tends to tilt the trolley upwardly about its front track roller 17. Due to the relatively high pivoting of the load hanger 23 at 38 between the load and guide rollers of the trolley carriage, this tendency is most effectively resisted and the trolley is most effectively held to the track. The lower the load is hung the more pronounced is the tilting effect.

While on a run of the trolley along a horizontal reach of the track, the upsetting or up-ending tendency can be put up with, so long as the pivot 38 of the hanger bar 23 lies between parallel gravitaitonal load planes through the load roller shafts or axes 34, and, regardless of the elevation of the pivot 38 on the carriage, the tendency becomes very objectionable when the trolley is being propelled by chain 27 up a grade or slope, of even 30° angularity such as is commonly found in conveyor installations of the type in quetsion. In this case, a low suspension of the hanger on the trolley is likely to cause the line of vertical or gravitational action of a hanger and its load to fall forwardly of a gravitational, vertical load component on the forward trolley roller 17, acting through its axle or axis 34. Under this situation, the vertical downward load moment of the hanger about the axis of the forward roller combines with the forward force couple of the power conveyor dog 28 on the forward trolley dog 32 about the same axis, and forward tilting or up-ending is apt to occur, requiring the use of special hold-down means to restrain the trolley vertically.

Referring to Fig. 2 of the drawings, the reference numeral 40 generally designates a horizontal transfer chain which is mounted adjacent the switch mechanism 11, as shown in my copending application. This chain is located inwardly of the main track sections 12, 12' and the branch track section 14, being trained to traverse a generally triangular though rounded path. The transfer chain 40 is driven in a caterpillar fashion from the main trolley advancing chain 27; and to this end chain 40 is provided with a series of laterally outwardly extending driving dog units 41. Each such unit comprises a lug or dog 42 welded to a link of the chain 40 and having driving engagement with main chain 27, and a downwardly spaced, outwardly extending trolley engaging and forwarding dog or lug 43, the lug 43 being of somewhat greater length, in the lateral sense, than the dog 42.

The transfer chain 40 is backed up by a rounded guide way 44 concentric with the branch track portion 15 (Fig.

2), and as it extends in the direction of branch track section 14, the guide 44 is angled away from that section, for the purpose of gradually disengaging the trolley advancing lugs 43 of chain 40 from the trolleys engaged and driven thereby in effecting the transfer movement through switch 11. Main driving chain 27 may be backed by vertically journaled rollers 45.

Thus it is seen that the dogs 42 of transfer chain 40 engage the main drive chain 27 to derive power, and that the transfer chain lugs 43 come into position between the trolley dogs 31, 32 to push the trolley through the switch 11 in the open position thereof shown in dotted line in Fig. 4. Departing from the switch zone onto the branch track, the leading guide roller 21 of the driven trolley 10 engages the reset arm 20″ of switch unit 11 to restore its tongue 20 to normal solid line position, for a straight-through travel of further trolleys along main track sections 12, 12′.

Simple mathematical computations establish the fact that, with the axis 28 of hinged suspension of the load located as high as is practically possible between forward and rearward load rollers 17, and when the trolley is propelled up a slope, the line of gravitational load on the trolley itself is brought between front and rear resultants of the downward component of (a) a force-couple exerted upon the forward trolley dog (the moment arm of which is the distance between the dog and a plane through the axes of the forward and rear rollers), combined with (b) components of trolley-on-track load effect on the forward and rearward rollers. Hence, regardless of slope (within reasonable limits), there will never be any tendency of the trolley, occasioned by an upward resultant at the rear roller, to tilt or up-end forwardly about its forward roller axis, hence requiring hold-down provisions to hold the rearward roller in contact with the track.

What I claim as my invention is:

1. A traveling work supporting unit comprising a carriage provided with forward and rearward load bearing rollers journaled on parallel axes and adapted to roll on a track, a dog connected with said carriage for driving the carriage, said dog projecting upwardly in relation to said forward and rearward roller axes and between the same for forward driving engagement above said axes by a power member acting in a force-couple about the forward axis, and means for pivotally suspending a load supporting hanger on said carriage on an axis between said forward and rearward roller axes and in sufficiently closely adjacent vertical relation to and below a plane through said roller axes to at all times, regardless of the slope of travel of said unit, maintain the gravitational action of said hanger and its load on a line between downward components of combined load action on said forward and rearward load rollers and force-couple action of said power member about said forward axis, thereby to prevent up-ending of said rearward rollers from said track, as in ascending a slope.

2. A traveling work supporting unit comprising a carriage provided with pairs of forward and rearward load bearing rollers journalled on parallel axes and each including rollers transversely spaced in the direction of their axes and adapted to roll on laterally spaced horizontal track members, a dog connected with said carriage for driving the carriage, said dog projecting upwardly in relation to said forward and rearward roller axes and between the same for forward driving engagement above said axes by a power member acting in a force-couple about the forward axis, means for pivotally suspending a load supporting hanger on said carriage on an axis between said forward and rearward roller axes, said last named axis being located in sufficiently closely adjacent vertical relation to a plane through said roller axes to at all times, regardless of the slope of travel of said unit, maintain the gravitational action of said hanger and its load on a line between downward components of combined load action on said forward and rearward roller axes and force-couple action of said power member about said forward axis, thereby to prevent up-ending of said rearward roller from said track, as in ascending a slope, and a pair of forward and rearward, vertically journalled guide rollers located on said carriage adjacent the rollers of said respective forward and rearward pairs and adapted to be guided between vertical portions of said track members.

References Cited in the file of this patent

UNITED STATES PATENTS

| | | |
|---|---|---|
| 1,312,417 | Mosher | Aug. 5, 1919 |
| 1,443,382 | Rapier | Jan. 30, 1923 |
| 1,690,502 | Raymond | Nov. 6, 1928 |
| 1,850,048 | Ballew | Mar. 15, 1932 |
| 2,485,215 | Rose | Oct. 18, 1949 |
| 2,868,138 | Bishop et al. | Jan. 13, 1959 |
| 2,868,139 | Klamp | Jan. 13, 1959 |
| 2,875,703 | Bishop et al. | Mar. 3, 1959 |